United States Patent [19]

Miller et al.

[11] Patent Number: 4,632,443
[45] Date of Patent: Dec. 30, 1986

[54] SAFETY SHACKLES

[75] Inventors: Clifton L. Miller; Nigel R. Plumridge, both of Tasmania, Australia

[73] Assignee: Millridge Safety Developments Pty. Ltd., Tasmania, Australia

[21] Appl. No.: 717,244
[22] PCT Filed: Jul. 12, 1984
[86] PCT No.: PCT/AU84/00135
   § 371 Date: Mar. 5, 1985
   § 102(e) Date: Mar. 5, 1985
[87] PCT Pub. No.: WO85/00414
   PCT Pub. Date: Jan. 31, 1985

[51] Int. Cl.[4] .............................................. B66C 1/36
[52] U.S. Cl. .............................. 294/82.34; 24/241 PS; 294/82.11
[58] Field of Search .................. 294/75, 82.11, 82.25, 294/82.27, 82.31–82.34; 24/241 P, 241 PP, 241 PS, 241 SL, 241 SB, 232 R

[56] References Cited
U.S. PATENT DOCUMENTS 842,482 1/1907 Matson ............................ 294/75 X
1,219,942 3/1917 Hiatt ................................ 24/241 PS
1,477,836 12/1923 McGowan ........................ 294/82.34

FOREIGN PATENT DOCUMENTS 8264475 6/1977 Australia .
1170783 2/1983 Australia .
687927 2/1940 Fed. Rep. of Germany ... 294/82.34
984166 7/1951 France .
97865 1/1940 Sweden ............................ 294/82.34
88996 4/1921 Switzerland .................... 294/82.33
143348 5/1920 United Kingdom ............ 294/82.33
288462 4/1928 United Kingdom .
825575 12/1959 United Kingdom ............ 294/82.34

Primary Examiner—Johnny D. Cherry
Attorney, Agent, or Firm—Scully, Scott, Murphy & Presser

[57] ABSTRACT

A combination shackle and line comprising a body, a closure member, and a shackle line connected to the body and extending therefrom. A latch is supported by the body for movement between a first position to hold the shackle closed, and a second position to allow the shackle to open. A latch release line is connected to the latch, and extends therefrom to pull the latch from the first to the second positions.

11 Claims, 5 Drawing Figures

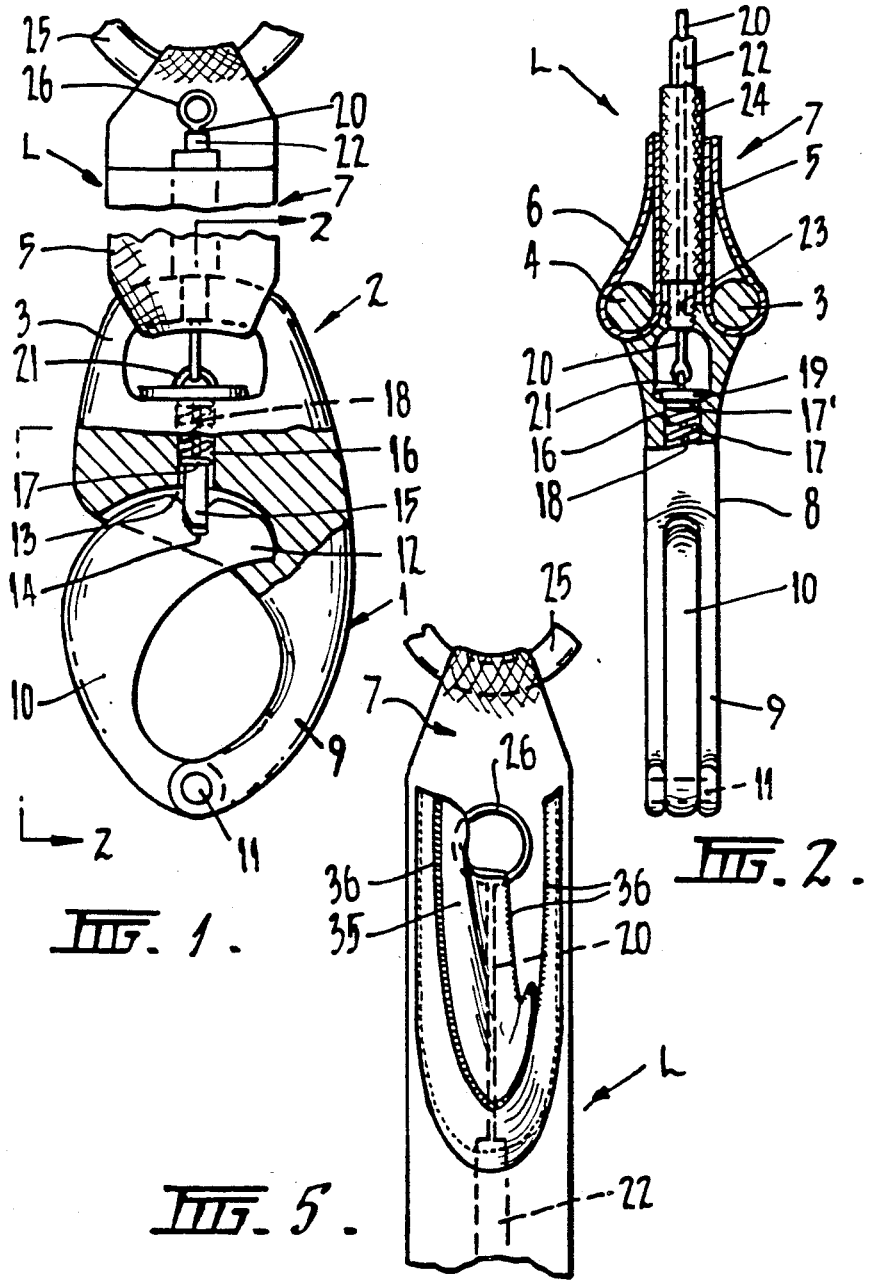

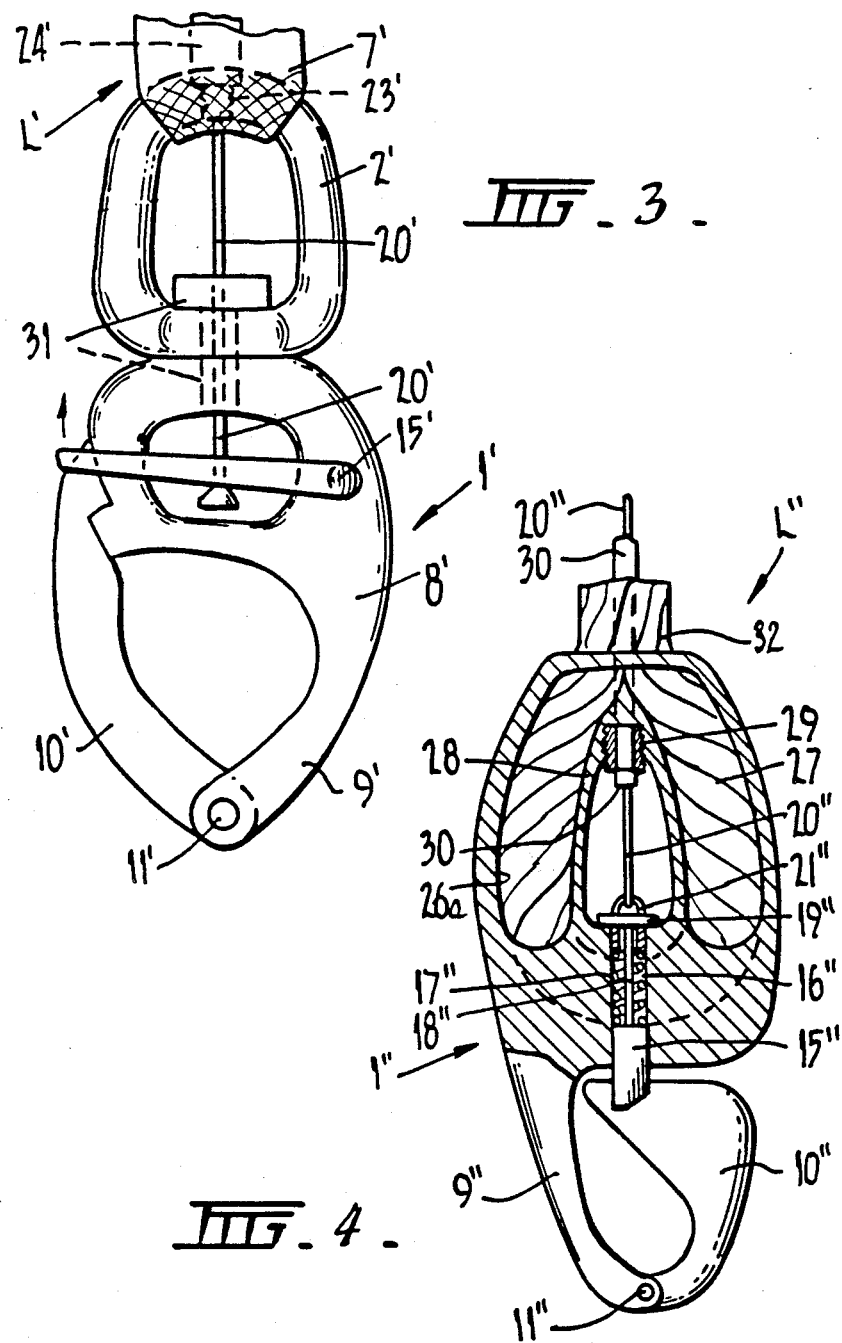

SAFETY SHACKLES

BACKGROUND OF THE INVENTION

This invention relates to safety shackles and snap clips having attached safety lines, life lines or the like which may be used for various purposes, including the attachment of life lines to yachts, the attachment of life rafts/boats to ships in danger of sinking, the attachment of safety lines in rock climbing and the attachment of loads to cranes and other lifting devices.

Shackles for connecting life lines to the strong point on a yacht and/or for connecting the life line to the safety harness of the crew member commonly incorporate a quick-release mechanism in the form of a release catch having an axis of operation in the direction perpendicular to the direction of load on the shackle. This arrangement is most undesirable since the load applied to the shackle, being in a direction perpendicular to the direction of actuation of the release catch, often causes the release catch to jam thereby preventing release in what may be a life or death situation. Another disadvantage with the known release catch arrangement as used in snap clips and some snap shackles is that the catch is usually located externally of the shackle and in certain circumstances the catch may be accidentally released by the life line or other external means, such as a projecting part of the yacht, once again with the possibility of disastrous consequences.

In addition to the above, since the release mechanism for the latch is located near the strongpoint, it may be impossible for the crew member restrained by the life line to reach the release mechanism and then succeed in taking the load off the life line in order to undo the mechanism or snap clip, especially where the yacht sinks suddenly. A disadvantage of simply relying on a release clip at the wearer's end of the life line is that this system only encourages detaching of the life line when the wearer wishes to move around the boat. This is of course a most undesirable situation.

Although shackles having release actions which are substantially parallel to the direction of the applied load and shackles having remotely actuatable release mechanisms may be found in the literature, see for example U.K. Pat. No. 825575 Kjolner, French Patent Publication No. 2483791 Kaminski and U.S. Pat. Nos. 3493260 Smith and 4093293 Huggett, none of the described shackles has found commercial application for the uses outlined in greater detail above. The present inventors believe this may be due to the fact that the release line for each shackle is separate from the life line assembly and therefore creates the possibility of entanglement and inadvertent release. Furthermore, the remote release shackles described in the literature referred to above suffer from the disadvantage that they either require the shackle to be in a no-load condition for release or they require the release line to be in a taut condition. The latter problem is particularly evident where the shackle is to be released when the release line is in a tangled condition which often occurs with life lines for yacht crew members. Still further, all of the remote release mechanisms are of necessity actuated along a line which is spaced from the line of applied force and this may lead to jamming of the release line and may prevent the use of swivel joints where appropriate.

SUMMARY OF THE INVENTION

In the light of the above described difficulties it is the object of the present invention to provide a shackle/line combination in which the above described problems and shortcomings of the prior art are at least substantially ameliorated.

The present invention provides a shackle comprising a body, a closure member pivoted to the body, latch means holding the closure member in the closed position, means for releasing said latch means to open said closure means, means connecting a line to the body, said latch means being arranged so that the axis of its releasing action is at least substantially coincident with the principal axis of the load to be applied to the shackle by the line, characterised in that said line incorporates a release line located in guidance means contained in or attached to the line, said release line having means at one end of the line attached to said releasing means and having means for enabling manual actuation of the release line at the other end thereof, said release line extending from said releasing means along a line which is at least closely parallel to the principal axis of load to be applied to the shackle by the line.

The release line is preferably in the form of a Bowden Cable enclosed within the line. In one particularly preferred form, the line comprises a tube of webbing within which the cable is enclosed, preferably within a flexible support hose anchored to the cable, which reduces the likelihood of kinking in the cable.

In a preferred form of the invention, the latch comprises a spring-loaded detent to which an actuating pin is attached. The detent preferably engages a bore formed in the closure member and the spring-loading is such as to maintain said detent in said bore in the absence of actuation of the release means.

To enable manual actuation the pin is preferably formed with an enlarged flanged head which is manually grippable by the user's fingers for actuation to lift the pin to raise the detent out of its bore against the action of said spring-loading.

In another form of the invention, the release line is located in a guidance tube located centrally within a rope or wire serving as the main line. One end of the release line extends from the rope within a loop to which a harness or the like is attached while the other end extends from the other end of the rope and is attached to the latch release mechanism.

By suitably constructing the rope or line, the release line may be located within a central cavity within the rope and defined by the strands of the rope itself. In this case the guidance means is the rope itself.

BRIEF DESCRIPTION OF THE DRAWINGS

Several preferred embodiments of the invention will now be described with reference to the accompanying drawings in which:

FIG. 1 is a fragmentary sectional elevation of a shackle/line combination embodying the invention;

FIG. 2 is an end elevation of the shackle/line combination of FIG. 1;

FIG. 3 is a front elevation of a further shackle/line combination embodying the invention;

FIG. 4 is a fragmentary sectional elevation of a still further shackle/line combination embodying the invention; and FIG. 5 is a plan view of a pouch for housing the release ring at the wearer's end of the life line.

DESCRIPTION OF PREFERRED EMBODIMENTS

Referring firstly to FIGS. 1 and 2 of the drawings, the shackle will be seen to comprise a body 1 which is cast from a suitable material such as stainless steel or high strength reinforced plastics material, said body including a connector 2 to which a line L is securely attached.

The connector 2 is in the form of two connecting loops 3, 4 around which end portions 5, 6 of a webbing tube 7 defining the life line L are attached by sewing or other suitable means. Loops 3, 4 extend from a central body portion 8 from which a shackle leg 9 extends. A shackle closure or tongue 10 is pivotally connected to the lower most end of the leg 9 by means of a hinge pin 11. The free end 12 of the tongue 10 is received in a recess 13 formed in the body 8 and the tongue 10 is formed with a latching bore 14 which receives a latching detent 15 mounted in a bore 16 located centrally in the body 8. The detent 15 is biased towards engagement with the latching bore 14 by means of a spring 17 which bears against a closure 17' fixed in the end of the bore 16. A release pin 18 extends upwardly from the detent 15 and has a flanged head 19 by means of which the detent 15 may be manually raised to release the tongue 10.

A release cable 20 is fastened to a connecting loop 21 on the head 19 to enable remote release of the detent 15. The release cable forms part of a Bowden Cable 22 which has one end of its outer casing threadably engaged with a threaded bore 23 in the connector body 2 between the loops 3 and 4. The Bowden Cable 22 extends upwardly from the connector to enter the webbing tube 7 and is contained in a support hose 24 of rubber or plastics material which reduces the likelihood of kinking in the cable 22 and incidentally prevents kinking of the webbing tube 7 defining the line L. The support hose 24 is anchored securely to the outer casing of the Bowden Cable 22 by means of a clamp (not shown).

The other end of the webbing tube 7 is fixed to a conventional snap shackle 25 which is adapted to be attached to the safety harness of the crew member. The Bowden Cable 22 projects from the end of the webbing tube 7 and has a release ring 26 attached to the free end of the release cable 20. In this way, the release line may be manually actuated by the crew member to in turn release the detent 15 to allow disengagement of the tongue 10 from the strong point of the yacht or the like.

It will be appreciated that in practice the life line L may be approximately three meters long and it may therefore be difficult, or in some cases impossible, for the crew member to reach the shackle at its point of attachment to the strong point of the boat. Where the boat is sinking rapidly, the life line will be taut and the crew member will be unable to reach the shackle to release the life line. Thus, the present invention provides a means whereby the crew member may quickly release the life line from the strong point on the boat simply by grasping the release ring 26 which is positioned adjacent to the point of attachment of the life line to the safety harness of the crew member. Alternatively, release of the life line from the strong point may be achieved from a remote position even when the life line is in a slack, coiled or tangled condition. This is an additional safety feature as it prevents the need to make any move around the boat while not secured by the life line. The support hose 24 prevents not only the Bowden Cable 22 but also the webbing tube 7 from kinking and accordingly the release line 20 may be actuated irrespective of the condition of the life line 1.

Because of the central positioning of the release detent 15 along the major axis of the applied load, the detent is easily released even when the shackle is under heavy load. The remote releasability of the detent 15 is also improved by the positioning of the release line 20 along the axis of the applied load since the release force is directly applied to the detent 15 by the release line 20. Furthermore, since the release line is contained within the body of the shackle and within the life line L, tangling and inadvertent actuation of the release line 20 is avoided. However, if desired, the detent 15 may be manually released by means of the flanged head 19.

Referring now to FIG. 3 of the drawings, a modified form of shackle, which is an adaption of a commercially available shackle (manufactured by Wichard of France), is shown. In the drawing, similar primed reference numerals are used to indicate similar parts to those shown in FIGS. 1 and 2 of the drawings.

In this embodiment, the webbing tube 7' is attached to a split bale connector 2' as shown in FIG. 2. The bale is connected to the shackle body 1' by a heavy rivet 31 around the collar of which the bale is free to swivel. Through this rivet the end of the release cable 20' is connected to a spring-loaded latching mechanism 15' which holds the tongue 10' of the shackle in its closed position until the latch is released by the line 20' or manually. The spring-loading is achieved by adjacent anchoring of the securing points for the spring system which is external to the shackle body 8'. Similar advantages flow from the use of the remote release line 20' and from the application of the releasing force along the central axis of the shackle and of the life line L'.

Although not presently preferred, the webbing tube/Bowden Cable arrangement described above may be replaced by a specially made rope containing the release mechanism. For example, the rope may be wound around a central tubular core of nylon or other suitable material which in turn contains a small diameter release line such as a plastic coated steel cable or other line of suitable strength having a low co-efficient of friction at its surface. One such special line is shown in greater detail in FIG. 4 of the drawings and will be described in greater detail below.

In the embodiment of FIG. 4 of the drawings, the shackle 1" is similar to the shackle shown in FIG. 1 of the drawings and accordingly similar double primed reference numerals are used to indicate the similar parts. The principal difference between this shackle and the shackle of FIGS. 1 and 2 of the drawings is in the means for attaching the life line L" to the shackle 1". It will be noted that the attaching loops of the shackle shown in FIGS. 1 and 2 of the drawings are replaced by a cavity 26a which encloses a loop 27 formed in the end of a specially constructed rope 32 of the type described above. The cavity 26a includes a central portion 28 which defines the inner portion of the cavity 26a and serves to support a threaded collar 29 which engages and restrains the central tubular core 30 surrounding the release line 20", which is centrally contained within the rope 32 and projects therefrom into the loop 27. The cavity 26a is configured to deflect laterally the loop 27 in the rope 32 to avoid the release mechanism 15", 17" and 18". It will be appreciated that the housing of the loop 27 within the cavity 26a enables the core 30 to be extracted from the line 32 and secured in position in the collar 29 so that the core 30 and the release line 20" are maintained coincident with the line of action of the detent 15" which in turn facilitates smooth actuation of the detent 15" and smooth release of the tongue 10" of the shackle 1".

It will be appreciated that under load, the life line L, L' and L", whether in the form of a webbing tube or in the form of a specially constructed rope, will stretch under load and since the stretch characteristics of the line L will in most cases be substantially different to the stretch characteristics of the Bowden Cable, provision should be made to enable actuation of the remote release line 20 when the line L is in a stretched condition. An arrangement for overcoming this problem is shown in FIG. 5 of the drawings from which it will be noted that the release ring 26 attached to the end of the release line 20 is enclosed in a plastic pouch 35 into which the ring 26 is free to move as the life line L stretches under load. The pouch 35 is secured by stitching to the webbing 7 and is formed with one or more lines of weakness 36 along which the pouch 35 will split when the user's finger is inserted into the pouch 35 to gain access to the ring 26. It will be appreciated that the pouch 35 also reduces the likelihood of inadvertent actuation of the release line 20 by the ring 26 snagging on a projection or being actuated by a user who has fallen overboard and is holding the line while climbing or being pulled back aboard a boat.

What we claim is:

1. A combination shackle and line comprising:
a body;
a closure member connected to the body for movement between open and closed positions;
latch means supported by the body for movement between a first position to hold the closure member in the closed position, and a second position to allow the closure member to move from the closed position to the open position;
an elongated, flexible shackle line including a first longitudinal end having first and second sections;
the body including means connecting said first and second sections to the body and holding the first and second sections apart to form an end opening in the shackle line, said end opening being located in the body;
a release line having a first end connected to the latch means, and extending therefrom through the end opening in the shackle line and longitudinally through the shackle line; and
a handle connected to a second end of the release line to pull the release line along the shackle line to thereby move said latch means from the first position to the second position.

2. A combination according to claim 1, wherein:
the closure member defines a latching recess;
the latch means include
(i) a detent supported by the body for movement into and out of said latching recess, and
(ii) a spring connected to the detent and biasing the detent into the latching recess; and
the release line is connected to the detent to pull the detent out of the latching recess.

3. A combination according to claim 2, wherein:
the detent includes a flanged head to pull the detent from the latching recess independent of the release line; and
the body defines an opening providing access to the flanged head from outside the body.

4. A combination according to claim 1, wherein the release line includes:
an elongated tubular member enclosed within the shackle line; and
a cable extending through the elongated tubular member and supported for longitudinal sliding movement relative thereto.

5. A combination according to claim 4, wherein the shackle line includes:
a webbing forming a longitudinal passageway; and
a support hose located in the longitudinal passageway and housing the elongated tubular member to inhibit kinking thereof.

6. A combination according to claim 1, wherein the shackle line includes:
a rope forming a longitudinally extending passageway; and
a flexible guidance tube located in the passageway and guiding the release line therethrough.

7. A combination according to claim 1, wherein:
the first and second sections of the shackle line are connected together and form a loop;
the means connecting the first and second sections to the body include surfaces defining a cavity in the body; and
the loop is located at least partially in said cavity.

8. A combination according to claim 7, wherein the surfaces defining the cavity hold the loop away from the latch means.

9. A combination according to claim 1, wherein the means connecting the first and second sections to the body includes first and second means respectively connecting the first and second sections to the body.

10. A combination according to claim 9, wherein:
the shackle line defines a longitudinal passageway extending through the shackle line from the end opening therein;
the release line extends through said longitudinal passageway; and
the shackle line includes means held in the longitudinal passageway to guide the release line therethrough.

11. A combination shackle and line comprising:
a body;
a closure member connected to the body for movement between open and closed positions;
latch means supported by the body for movement between a first position to hold the closure member in the closed position, and a second position allowing the closure member to move from the closed position to the open position;
an elongated, flexible shackle line having a first longitudinal end connected to the body;
a release line having a first end connected to the latch means, and extending therefrom along the shackle line;
a handle connected to a second end of the release line to pull the release line along the shackle line to move said latch means from the first to the second positions, the handle being supported for longitudinal movement relative to the shackle line to allow the shackle line to stretch without engaging the handle; and
a pouch connected to a second end of the shackle line, and being adjustable between a closed position wherein the handle is housed within the pouch, and an open position wherein the pouch defines an opening providing access to the handle from outside the pouch.

* * * * *